(12) United States Patent
Larson et al.

(10) Patent No.: US 11,173,759 B2
(45) Date of Patent: Nov. 16, 2021

(54) TWO-WHEEL VEHICLE TRAILER-COUPLING ASSEMBLY

(71) Applicants: Douglas Larson, Juneau, AK (US); Teena Larson, Juneau, AK (US)

(72) Inventors: Douglas Larson, Juneau, AK (US); Teena Larson, Juneau, AK (US)

( * ) Notice: Subject to any disclaimer, the term of this patent is extended or adjusted under 35 U.S.C. 154(b) by 157 days.

(21) Appl. No.: 16/558,790

(22) Filed: Sep. 3, 2019

(65) Prior Publication Data
US 2021/0061031 A1 Mar. 4, 2021

(51) Int. Cl.
| | |
|---|---|
| *B60D 1/42* | (2006.01) |
| *B62K 27/00* | (2006.01) |
| *B60D 1/02* | (2006.01) |
| *B60D 1/14* | (2006.01) |
| *B60D 1/48* | (2006.01) |
| *B60D 1/145* | (2006.01) |
| *B60D 1/00* | (2006.01) |

(52) U.S. Cl.
CPC ............. *B60D 1/42* (2013.01); *B60D 1/02* (2013.01); *B60D 1/143* (2013.01); *B60D 1/145* (2013.01); *B60D 1/488* (2013.01); *B62K 27/003* (2013.01); *B60D 2001/003* (2013.01)

(58) Field of Classification Search
CPC .... B60D 2001/003; B60D 1/02; B60D 1/143; B60D 1/145; B60D 1/42; B60D 1/488; B62K 27/003; B62K 27/12

USPC ................. 280/204, 492, 493, 494
See application file for complete search history.

(56) References Cited

U.S. PATENT DOCUMENTS

| | | | | |
|---|---|---|---|---|
| 4,548,423 A | * | 10/1985 | Craven | B60D 1/00 280/204 |
| 4,711,461 A | * | 12/1987 | Fromberg | B60D 1/02 280/494 |
| 5,695,208 A | | 12/1997 | Baechler et al. | |
| 6,099,008 A | | 8/2000 | Caffey | |
| 6,663,126 B2 | | 12/2003 | Britton et al. | |
| 7,131,657 B1 | * | 11/2006 | Witt | B62K 27/003 280/292 |
| 2015/0115573 A1 | * | 4/2015 | Bossel | B62K 27/14 280/504 |
| 2020/0101804 A1 | * | 4/2020 | Wei | B60D 1/025 |

* cited by examiner

*Primary Examiner* — Minnah L Seoh
*Assistant Examiner* — Hosam Shabara
(74) *Attorney, Agent, or Firm* — Han Santos, PLLC

(57) ABSTRACT

A trailer-coupling assembly is described for securing a trailer to a two-wheel vehicle. The trailer-coupling assembly is rigidly fixed to a rear-wheel frame of a two-wheel vehicle and the utility bed of a trailer. The trailer-coupling assembly is comprised of three joints that each rotate about three separate cardinal axes, permitting the trailer to navigate rough terrain without transferring rotational loading to the two-wheel vehicle. Each joint is configured to rotate at least 90 degrees in a clockwise direction and an anti-clockwise direction about a cardinal axis, providing the trailer-coupling assembly with flexibility to navigate the two-wheel vehicle and trailer over various grades of rough terrain.

20 Claims, 8 Drawing Sheets

TWO-WHEEL VEHICLE TRAILER-COUPLING ASSEMBLY

BACKGROUND

The use of trailers with two-wheel vehicles has increasingly become popular among cyclists who have discovered that trailers provide ways of increasing the utility and capacity of their two-wheel vehicles. Trailers have been developed to carry various uses and to carry various loads, such as children, shopping, and hauling laundry and other loads.

Historically, trailer-coupling assemblies that secure a trailer to a two-wheel vehicle permit limited rotation of the trailer relative to the two-wheel vehicle. Accordingly, such trailer-couplings are typically suited for securing a trailer over even terrain surfaces, and ill-suited for rough terrain which may cause the trailer to abruptly roll, pitch, and yaw. Abrupt changes in terrain may cause the trailer-coupling to reach its rotational limits, and in doing so, transfer rotational forces from the trailer to the two-wheel vehicle. Depending on the extent of the change in terrain, the rotational forces may be of sufficient magnitude to cause a loss of control of the two-wheel vehicle.

In view of the aforementioned shortcomings of known bicycle trailer hitches, there is a need for a trailer-coupling assembly that can facilitate a two-wheel vehicle towing a trailer over various grades of terrain, including rough surface terrain, without risking a transference of rotational forces that may lead to a loss of control of the two-wheel vehicle.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 1A illustrates an isometric side-view and FIG. 1B illustrates a planform view of the exemplary embodiment.

FIG. 2A illustrates an assembled view of the trailer-coupling assembly. FIG. 2B illustrates an exploded view of the trailer-coupling assembly shown in FIG. 2A.

FIG. 3A illustrates a baseline orientation of the trailer-coupling assembly.

DETAILED DESCRIPTION

Figure 1A:
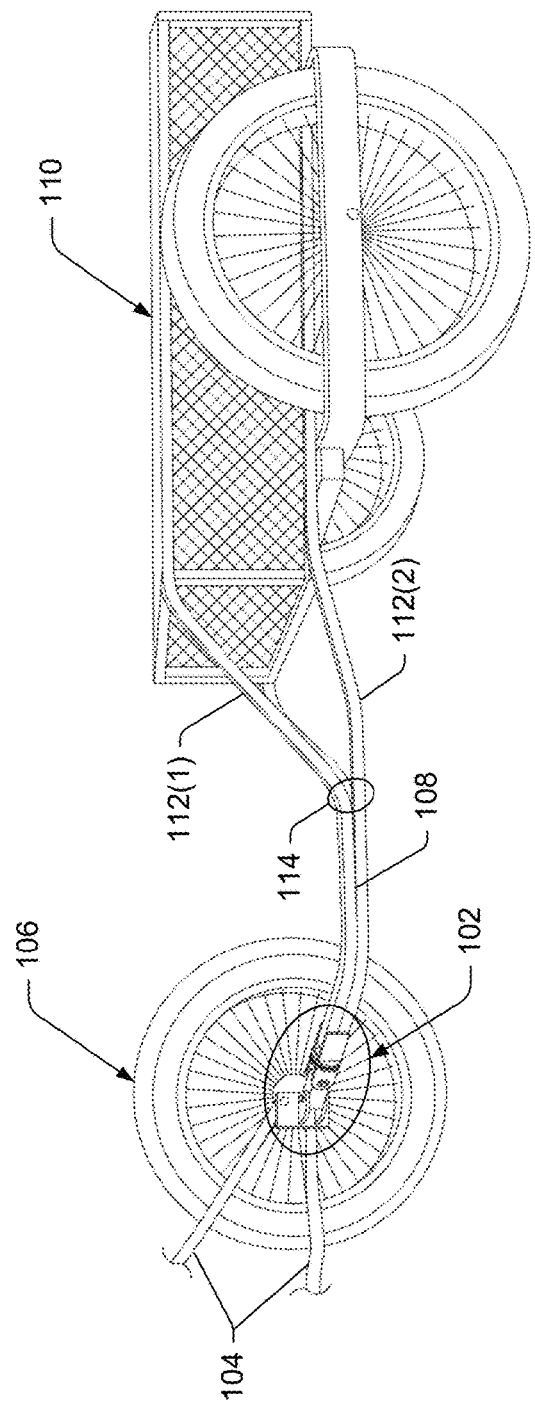
FIGS. 1A and 1B illustrate an exemplary embodiment of the trailer-coupling assembly in situ between a two-wheel vehicle and an all-terrain trailer.

This disclosure describes a trailer-coupling assembly that is designed to secure an all-terrain trailer to a two-wheel vehicle. The trailer-coupling assembly may be configured to permit a two-wheel vehicle to tow an all-terrain trailer (hereinafter "trailer") over rough surface terrain without having the trailer transfer overturning (i.e. rotational) forces to the two-wheel vehicle that may cause the two-wheel vehicle to lose control. More specifically, the trailer-coupling assembly may relieve pitch, yaw, and roll forces imposed on the trailer by changes in underlying surface terrain, before those forces are cast onto the towing two-wheel vehicle. The trailer-coupling assembly may be configured to accommodate travel over various grades of terrain surface by providing for pitch, yaw, and roll rotations at relative angles up to and greater than 90 degrees. In this way, a two-wheel vehicle may tow the trailer over terrain that may cause the trailer to overturn and yet relieve a transfer of rotational forces from the trailer to the two-wheel vehicle. For example, the trailer-coupling assembly may permit pitch and yaw rotations in a clockwise direction and anti-clockwise direction relative to a baseline alignment, by up to 90 degrees, 135 degrees, or 160 degrees. Any angular rotation is permissible subject only to the geometric limits of the respective lug joints that are discussed in more detail below. Further, the trailer-coupling assembly may permit a roll rotation in a clockwise direction and anti-clockwise direction relative to a baseline alignment, by up to 360 degrees.

In the illustrated example, the trailer-coupling assembly may be comprised of three joints, positioned in sequence to make up the trailer-coupling assembly. Each joint is configured to permit rotation about one axis of three cardinal axes. In combination, all three joints may permit rotation of the trailer-coupling assembly about each of the three cardinal axes.

By way of example, consider a two-wheel vehicle navigating rough terrain with a trailer in tow. The trailer-coupling assembly may be used to attach the trailer to the two-wheel vehicle. As the two-wheel vehicle and trailer navigate the rough terrain, the rough terrain may cause the trailer to roll, pitch, and yaw, to various degrees dependent on surface roughness, and relative to the direction of movement. In this example, a rigid hitch coupling between the two-wheel vehicle and the trailer may lead to a transfer of the roll, pitch, and yaw forces from the trailer to the two-wheel vehicle that may cause the two-wheel vehicle to lose control, and in some cases, overturn. To mitigate the risk of the two-wheel vehicle losing control, or overturning, the trailer-coupling assembly is configured to permit simultaneous rotations about all three cardinal axes to be relieved by a combination of three joints. Each joint is configured to rotate in a clockwise and anti-clockwise direction. In combination, all three joints may accommodate pitch, yaw, and roll rotations that exceed at least 90 degrees in each clockwise and anti-clockwise direction (i.e. a 180-degree end-to-end rotation about each axis). In fact, the trailer-coupling assembly may relieve rotational loading associated with the trailer completely overturning (i.e. rolling 180 degrees in a clockwise or anti-clockwise direction).

In various examples, the trailer-coupling assembly may be comprised of three joints, namely a first lug joint, a second lug joint, and a rotational joint. The first lug joint may connect the two-wheel vehicle with a first link member; the second lug joint may connect the first link member to a second link member; and, the rotational joint may connect the second link member to a hitch-connect member that is rigidly fixed to the utility bed of the trailer. In some examples, the second link member may connect to the hitch-connect member via an intermediary third link member, as described with reference to FIG. 2b. In this latter example, the rotational joint is configured to connect the second link member and the third link member, and the third link member is rigidly fixed to the hitch-connect member.

The hitch-connect member is described in further detail below with reference to the trailer.

In various examples, the hitch-connect member may transfer shear and rotational loadings (i.e. moment and torsional loading) from the utility bed of the trailer to the trailer-coupling assembly. At the trailer-coupling assembly, the shear forces, in all three cardinal axes, may be transferred to the two-wheel vehicle via clevis pins at the first and second lug joints and the rotational joint. Further, the rotational loadings (i.e. moment and torsional loading) may be relieved at the trailer-coupling assembly via discrete rotations about clevis pins at the first and second lug joints and the rotational joint.

It is noteworthy that the ordered sequence of the three joints (i.e. first lug joint, second lug joint, and rotational joint) described above is for illustrative purposes only. One of ordinary skill in the art may appreciate that further variations and modifications can be made thereto to order the three joints in any sequence relative to one another, without departing from the scope of the invention as defined in the appended claims.

For ease of description, the cardinal x-axis is defined as being parallel to the longitudinal axis of the first link member that secures the trailer-coupling assembly to the two-wheel vehicle. Rotation about the x-axis may present a combined roll and yaw of the trailer. The degree of roll and yaw is dependent on the predetermined angle of the hitch-connect member relative to the two-wheel vehicle. The z-axis is defined as being perpendicular to the ground surface such that rotation about the z-axis represents a yaw rotation of the trailer. Further, a rotation about the y-axis, orthogonal to each of the x- and z-axes, represents a pitching and rolling rotation of the trailer relative to the two-wheel vehicle. Similar to the rotation about the x-axis, the degree of pitch and roll is dependent on the predetermined angle of the hitch-connect member relative to the two-wheel vehicle.

Additionally, the two-wheel vehicle, as described throughout this disclosure may include a motorized two-wheel vehicle, such as a motorcycle. Alternately, a two-wheel vehicle may be comprised of a non-motorized two-wheel vehicle, such as a bicycle. While this disclosure describes a trailer-coupling assembly intended to maintain control of a two-wheel vehicle towing a trailer, it is appreciated that further variations and modifications may be made thereto to accommodate a three-wheel vehicle or a four-wheel vehicle (i.e. motorized and non-motorized variants thereof). In this way, the same benefit of maintaining control of the three-wheel vehicle or four-wheel vehicle can be maintained irrespective of the movements of the trailer in tow.

Moreover, the various grades of terrain to which this disclosure is suited may include any grade of terrain, such as a smooth terrain, an undulating terrain, or a rough terrain. The measure of a grade of terrain relates to a surface roughness (i.e. surface texture) that causes a vehicle and trailer to rise and fall while in motion. Smooth terrain (i.e. small surface roughness/texture) may include groomed surfaces, such as a sidewalk, asphalt, concrete, or bitumen surface. Undulating surfaces (i.e. medium surface roughness/texture) may include gravel, cobblestone or granite setts that feature rippling or rolling rises and falls in surface contours, causing a vehicle with a trailer in tow to rise and fall in step. Rough terrain (i.e. high surface roughness/texture) may include hilly, rocky, bumpy, ungroomed mountain terrain that features abrupt changes in surface contours, which cause more pronounced rises and fall in vehicle and trailer movement, relative to an undulating surface.

Although a preferred embodiment of the invention, and an alternate design thereof, have been disclosed, it can be appreciated that further variations and modifications may be made thereto without departing from the scope of the invention as defined in the appended claims.

Figure 1B:
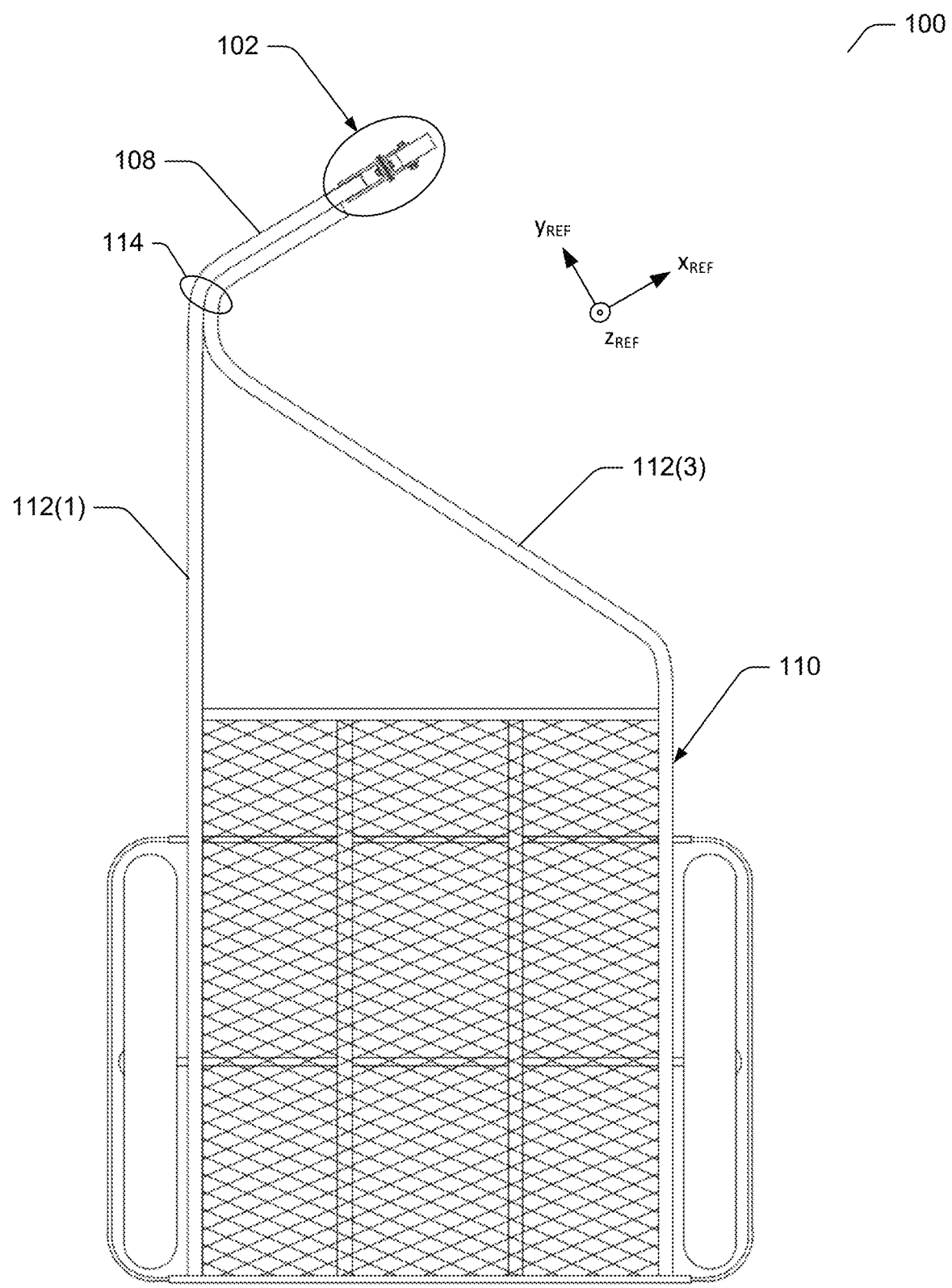

FIGS. 1A and 1B illustrate an exemplary embodiment 100 of the trailer-coupling assembly in situ between a two-wheel vehicle and an all-terrain trailer. FIG. 1A illustrates an isometric side-view and FIG. 1B illustrates a planform view of the exemplary embodiment 1. In the illustrated example, the trailer-coupling assembly 102 is configured to interface between the rear-wheel frame 104 of the two-wheel vehicle 106 and a hitch-connect member 108 of the all-terrain trailer (hereinafter, "trailer 110").

Referring to FIG. 1A, the trailer 110 may be comprised of a utility bed with a sidewall frame structure designed to support cargo capacity of the utility bed. In various embodiments, the utility bed may have a rectangular planform, a square planform, or any other planform shape that can accommodate cargo storage. Similarly, the sidewall frame structure may be fabricated of any predetermined height suitable for cargo storage. Variants of the trailer may include one axle with one set of pneumatic tires or one axle with two sets of pneumatic tires. Alternately, the trailer may include a front and rear axle each with one set of pneumatic tires or two sets of pneumatic tires.

The trailer 110 may include a trailer-support frame 112(1)-112(3) that is sized to join the utility bed of the trailer 110 to the trailer-coupling assembly 102 via a hitch-connect member 108. The trailer-support frame 112(1)-112(3) may be comprised of at least three support members that each rigidly attaches to separate corners of the front-face of the utility bed. In this way, the support members may provide a truss-like structure for translational and rotational loads, in all three cardinal axes (i.e. x-axis, y-axis, and z-axis), from the utility bed of the trailer 110 to the trailer-coupling assembly 102. In various examples, trailer-support frame 112(1)-112(3) may be fabricated using extruded materials having a rectangular thin-walled cross-section or a circular thin-walled cross-section. In other examples, the extruded materials may have a rectangular filled cross-section or a circular filled cross-section, depending partly on the load-bearing capacity of the trailer. More specifically, the trailer support frame 112(1)-112(3) may be fabricated from a grade of aluminum or steel, or any other material, that is suitable for the load-bearing capability of the trailer 110.

In the illustrated example, loads associated with translation and rotation of the utility bed may be transferred from each member of the trailer-support frame 112(1)-112(3) to the hitch-connect member 108 that interfaces with the trailer-coupling assembly 102. In this way, the hitch-connect member 108 may act as the interconnection between the trailer 110 and the trailer-coupling assembly 102. In one example, the hitch-connect member 108 may be comprised of a separate elongated member having two free ends. The first free end may be rigidly fixed to each member of the trailer-support frame 112(1)-112(3) at a point of convergence 114. The point of convergence 114 may correspond to a point forward of the utility bed of the trailer 110 in which each member of the trailer-support frame 112(1)-112(3) converges onto one another, and at which point the converged portion of the trailer-support frame 112(1)-112(3) are rigidly fixed to one another. Further, the second free end of the hitch-connect member 108 may be attached to the trailer-coupling assembly 102.

In an alternate example, hitch-connect member 108 may be comprised of a portion of the trailer-support frame 112(1)-112(3) between the point of convergence 114 and the trailer-coupling assembly 102. In this alternate example, the trailer-support frame 112(1)-112(3) may be comprised of three continuous members that extend from the utility bed of the trailer 110 to the trailer-coupling assembly 102. The hitch-connect member 108 may be defined as the converged portion of the trailer-support frame 112(1)-112(3) between the point of convergence 114 and the trailer-coupling assembly 102.

Referring to FIG. 1B, the trailer-support frame 112(1)-112(3) and the hitch-connect member 108, in combination, may be formed to orient the trailer-coupling assembly 102 at a predetermined angle relative to an attach point at the two-wheel vehicle 106. The predetermined angle may provide the rear-wheel frame 104 of the two-wheel vehicle 106 with clearance from the trailer 110, while the two-wheel vehicle 106 is traveling in a straight-line motion or turning in a left or right direction. The predetermined angle may be based at least in part on the turning angle of the two-wheel vehicle 106.

In various examples, the predetermined angle may be measured as the relative angle between a first longitudinal axis of the trailer-coupling assembly 102 and a second longitudinal axis of the two-wheel vehicle 106. The relative angle may be any angle less than 90-degrees and greater than zero degrees. In a preferred embodiment, the predetermined angle may be between 30-degrees and 60-degrees, so as to provide an efficient load transfer structure for shear loads between the trailer 110 and the two-wheel vehicle 106, while also providing the rear-wheel frame 104 of the two-wheel vehicle 106 with adequate clearance to turn in a left or right direction.

Additionally, the trailer-coupling assembly 102 may be positioned laterally relative to the two-wheel vehicle 106, such that the longitudinal axis of the trailer 110 is colinear with the longitudinal axis of the two-wheel vehicle 106. In this way, the trailer 110 can move in the same direction as the two-wheel vehicle 106 without having the two-wheel vehicle 106 induce a yaw rotation in the trailer 110. Alternatively, if the longitudinal axis of the trailer 110 is offset from the longitudinal axis of the two-wheel vehicle 106, the straight-line motion of the two-wheel vehicle 106 may induce yaw at the trailer 110, the magnitude of which is proportional to the offset between the respective longitudinal axes.

Figure 2A:
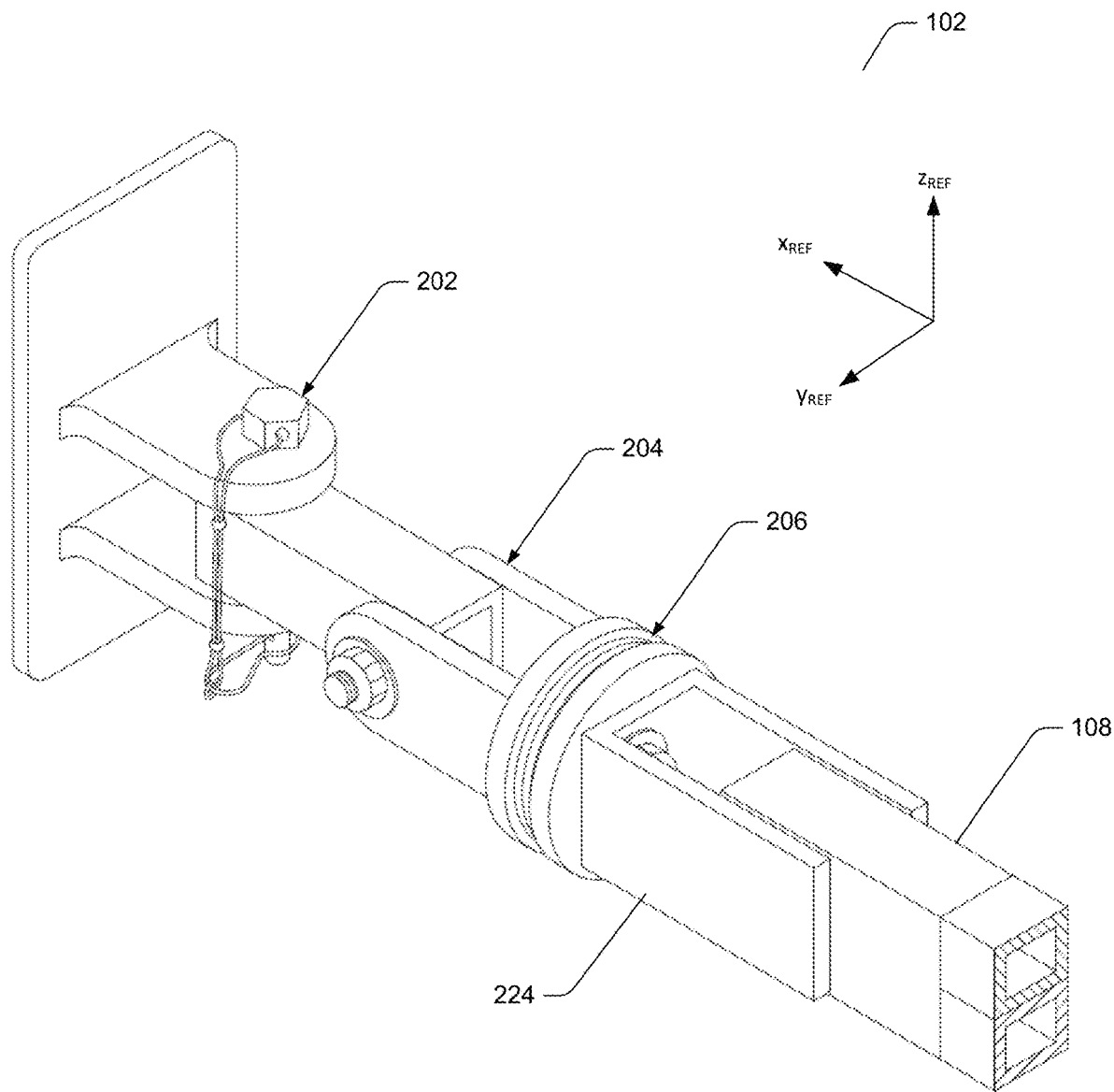
FIGS. 2A and 2B illustrate an isometric view of an exemplary embodiment of the trailer-coupling assembly.
Figure 2B:
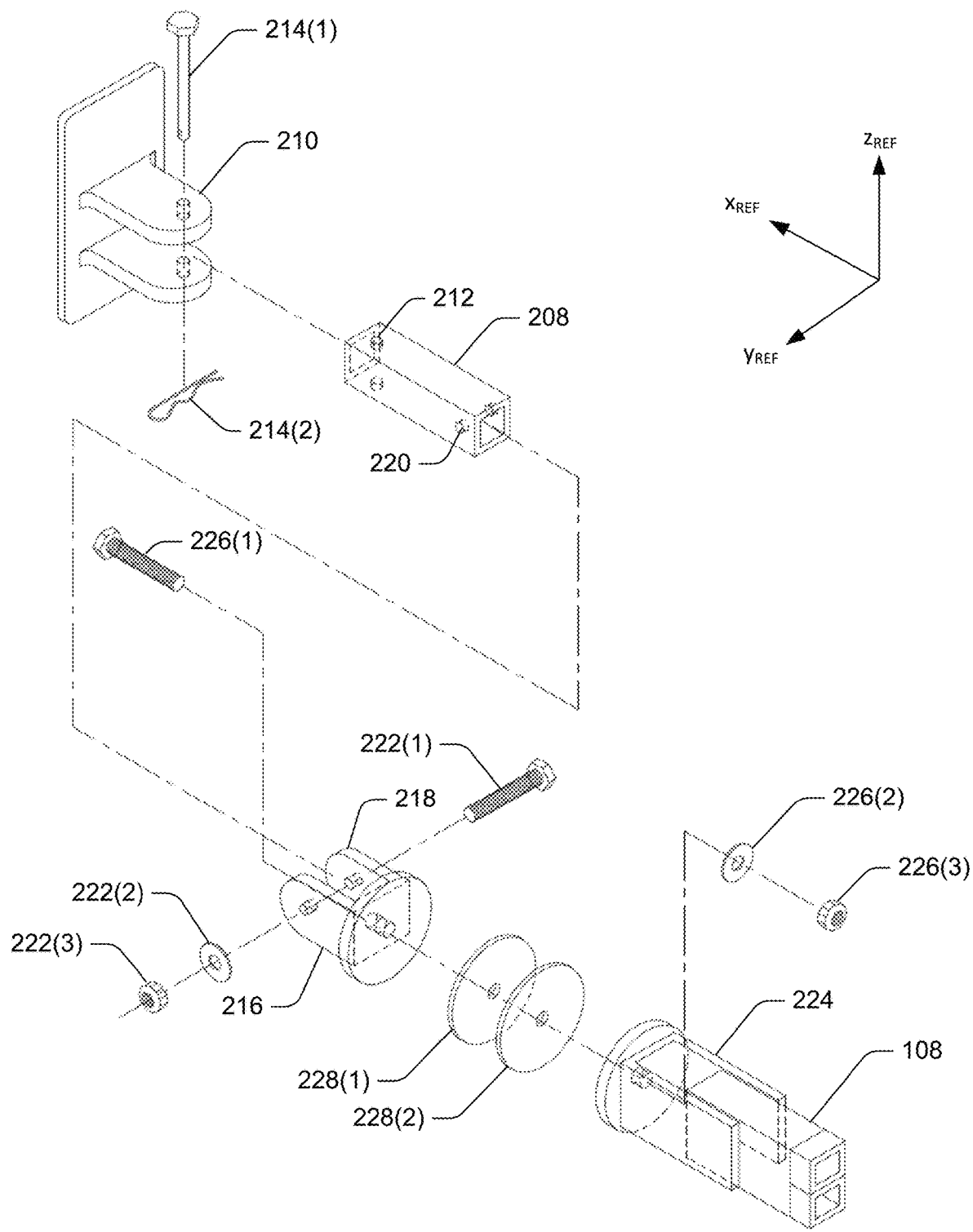

FIGS. 2A and 2B illustrate an isometric view of the trailer-coupling assembly 102. FIG. 2A illustrates an assembled view of the trailer-coupling assembly 102. FIG. 2B illustrates an exploded view of the trailer-coupling assembly 102 shown in FIG. 2A.

The trailer-coupling assembly 102, is comprised of three joints that each permit rotation about one cardinal axis (i.e. x-axis, y-axis, and z-axis, as defined earlier with reference to the overview of the disclosure). In combination, all three joints may permit rotation about each of the three cardinal axes.

Referring to FIG. 2A, the trailer-coupling assembly 102 is comprised of three joints, namely a first lug joint 202, a second lug joint 204, and a rotational joint 206. The first lug joint 202 is configured to transfer shear loading between the trailer 110 and the two-wheel vehicle 106 in all three cardinal axis directions and relieve rotational loading about the cardinal z-axis. The second lug joint 204 is configured to transfer shear loading between the trailer 110 and the two-wheel vehicle 106 in all three cardinal axis directions and relieve rotational loading about the cardinal y-axis. The rotational joint 206 is configured to transfer shear loading between the trailer 110 and the two-wheel vehicle 106 in all three cardinal axis directions and relieve rotational loading about the cardinal x-axis.

The ordered sequence of the three joints (i.e. first lug joint 202, second lug joint 204, and rotational joint 206) is described for illustrative purposes only. One of ordinary skill in the art may appreciate that further variations and modifications can be made thereto to order the three joints in any sequence relative to one another, without departing from the scope of the invention as defined in the appended claims.

Referring to FIG. 2B, the first lug joint 202 is configured to connect the two-wheel vehicle 106 to a first link member 208 of the trailer-coupling assembly 102. The first lug joint 202 may be comprised of a first double-shear lug 210 that is rigidly fixed to a rear-wheel frame 104 of the two-wheel vehicle 106, and a first single-shear lug 212 that is incorporated into a first free end of the first link member 208. The first double-shear lug 210 may be comprised of two parallel lug appendages, and the first single-shear lug 212 may be comprised of a single lug appendage that is sized to nest between each appendage of the first double-shear lug 210.

The first double-shear lug 210 and the first single-shear lug 212 may be joined via a first fastening system 214. In one example, the first fastening system 214 may correspond to a clevis pin 214(1) and locking pin 214(2). Alternately, any other suitable fastener and nut combination may be used. The first fastener configuration may transfer shear loading (i.e. x, y, and z shear loading) between the first double-shear lug 210 (i.e. attachment point to the two-wheel vehicle 106) and the first single-shear lug 212 (i.e. first free end of the first link member 208), while permitting rotation about the centroidal axis (i.e. cardinal z-axis) of the first fastening system 214 (i.e. centroidal axis of the clevis pin 214(1)) in a clockwise and anti-clockwise direction.

In various examples, the first double-shear lug 210 may attach to the two-wheel vehicle 106 using various techniques known to one of ordinary skill in the art. In one example, the first double-shear lug 210 may be fastened directly to the rear axle of the two-wheel vehicle 106. The axle-mounted hitch may provide a means to easily connect and disconnect the trailer-coupling assembly 102 from the two-wheel vehicle 106. Alternately, the first double-shear lug 210 may connect to a chain-stay (not shown) of the two-wheel vehicle 106. Additionally, modifications and variations of the first double-shear lug 210 may enable it to be fastened or clamped to a frame at the rear wheel connection of the two-wheel vehicle 106.

Referring again to FIG. 2B, the second lug joint 204 is configured to connect the first link member 208 to a second link member 216 of the trailer-coupling assembly 102. The second lug joint 204 may be comprised of a second double-shear lug 218 that is incorporated into a first free end of a second link member 216, and a second single-shear lug 220 that is incorporated into a second free end of the first link member 208.

The second double-shear lug 218 and the second single-shear lug 220 may be joined via a second fastening system 222. The second fastening system 222 may be comprised of a fastener 222(1), washer 222(2), and nut 222(3) combination. Alternately, and similar to the first lug joint 202, a suitable clevis pin and locking pin combination may be used. The second fastener configuration may transfer shear loading (i.e. x, y, and z shearing loading) between the second double-shear lug 218 (i.e. first free end of the second link member 216) and the second single-shear lug 220 (i.e. second free end of the first link member 208), while permitting rotation about the centroidal axis (i.e. cardinal y-axis) of the second fastening system (i.e. centroidal axis of the fastener 222(1)).

The second lug joint 204 may be oriented such that the longitudinal axis of the second fastening system 222 is orthogonal to that of the first fastening system 214. In this way, the first lug joint 202 and the second lug joint 204, in combination, may permit rotation about two orthogonal axes, namely the cardinal z-axis and the cardinal y-axis.

While the second double-shear lug 218 has been described as being incorporated into the second free end of the first link member 208, it can be appreciated that variations and modifications may be made such that the second double-shear lug 218 may be incorporated into the first free end of the second link member 216, and the second single-shear lug 220 may be incorporated into the second free end of the first link member 208.

In the illustrated example, the rotational joint 206 is configured to connect the second link member 216 to a third link member 224 of the trailer-coupling assembly 102. The third link member 224 may be rigidly fixed to the hitch-connect member 108, and the hitch-connect member 108 may be rigidly fixed to the utility bed of the trailer 110. The rotational joint 206 may join a second free end of the second link member 216 and a first free end of the third link member 224 via a third fastening system 226. The third fastening system 226 may be comprised of a fastener 226(1), washer 226(2), and nut 226(3) combination. Alternately, and similar to the first lug joint 202, a suitable clevis pin and locking pin combination may be used. The third fastening configuration may transfer shear loading (i.e. x, y, and z shear loading) between the second link member 216 and the third link member 224, while permitting rotation about the centroidal axis (i.e. cardinal x-axis) of the third fastening system (i.e. centroidal axis of the fastener 226(1)). Further, the third fastening configuration may include one or more washers 228(1) and 228(2) positioned between the interfacing surfaces of the second link member 216 and the third link member 224. The washers 228(1) and 228(2) may serve dual purposes at the rotational joint, namely to preserve the integrity of the interfacing free ends of the second link member 216 and the third link member 224, and to reduce rotational friction at the rotational joint 206 due to surface abutment between the second link member 216 and the third link member 224.

In one example, washers 228(1) and 228(2) may be rigidly fixed to each of the second link member 216 and the third link member 224, respectively. The purpose of washers 228(1) and 228(2) is to preserve the integrity of the interfacing free ends of the second link member 216 and the third link member 224 during rotational movements of the rotation joint 206.

In this example, washer 228(1) may be rigidly fixed to the second link member 216 at the rotational joint 206 via an epoxy-based resin, or similar adhesive. Similarly, washer 228(2) may be rigidly fixed to the third link member at the rotational joint 206 using a similar adhesive. In one embodiment, washers 228(1) and 228(2) may be stainless steel. In this embodiment, the epoxy-based resin, or similar adhesive, serves dual purposes, namely to rigidly fix washer 228(1) and 228(2) in place, and provide a barrier between washer 228(1) and the second link member 216, and washer 228(2) and third link member 224. The presence of the barrier is intended to prevent oxidation of washers 228(1) and 228(2) that may occur between aluminum embodiments of the second link member 216 and the third link member 224 and stainless-steel embodiments of washers 228(1) and 228(2).

It is noteworthy that one or more additional washers (not shown) may nestle between washers 228(1) and 228(2) at the rotation joint 206. The purpose of additional washers is to reduce rotational friction at the rotational joint 206. These additional washers may be fabricated from a plastic or nylon material, or any other material with a suitable friction coefficient.

The rotational joint 206 may be oriented such that the longitudinal axis of the third fastening system 226 is orthogonal to that of the first fastening system 214 and the second fastening system 222. In this way, the first lug joint 202, the second lug joint 204, and the rotational joint 206, in combination, may permit rotation about three orthogonal axes, namely, the cardinal z-axis, the cardinal y-axis, and the cardinal x-axis, respectively.

Figure 3A:
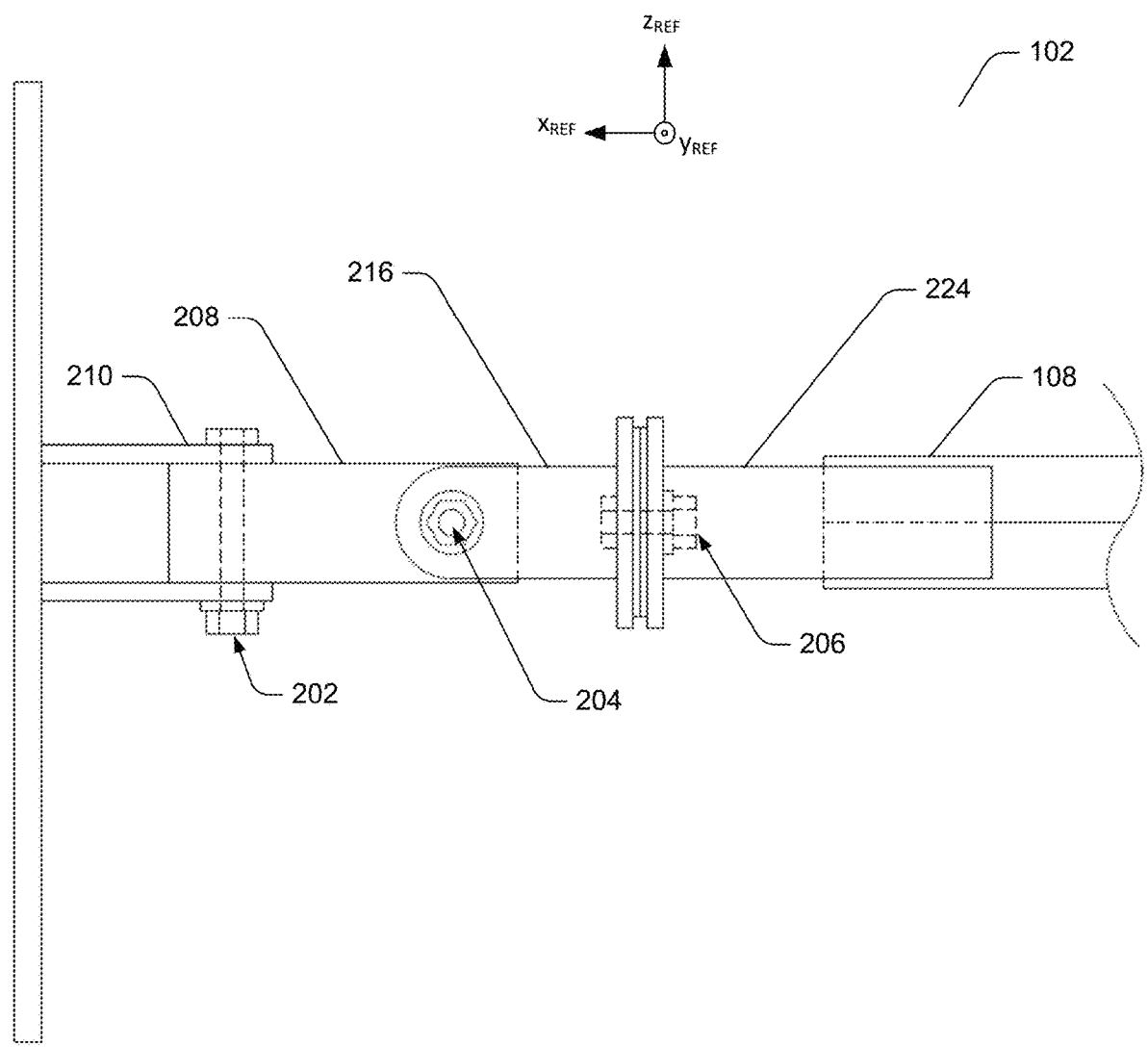
FIG. 3A through to 3D illustrate an exemplary embodiment of the trailer-coupling assembly exhibiting angular rotations at each joint relative to a baseline orientation.
Figure 3B:
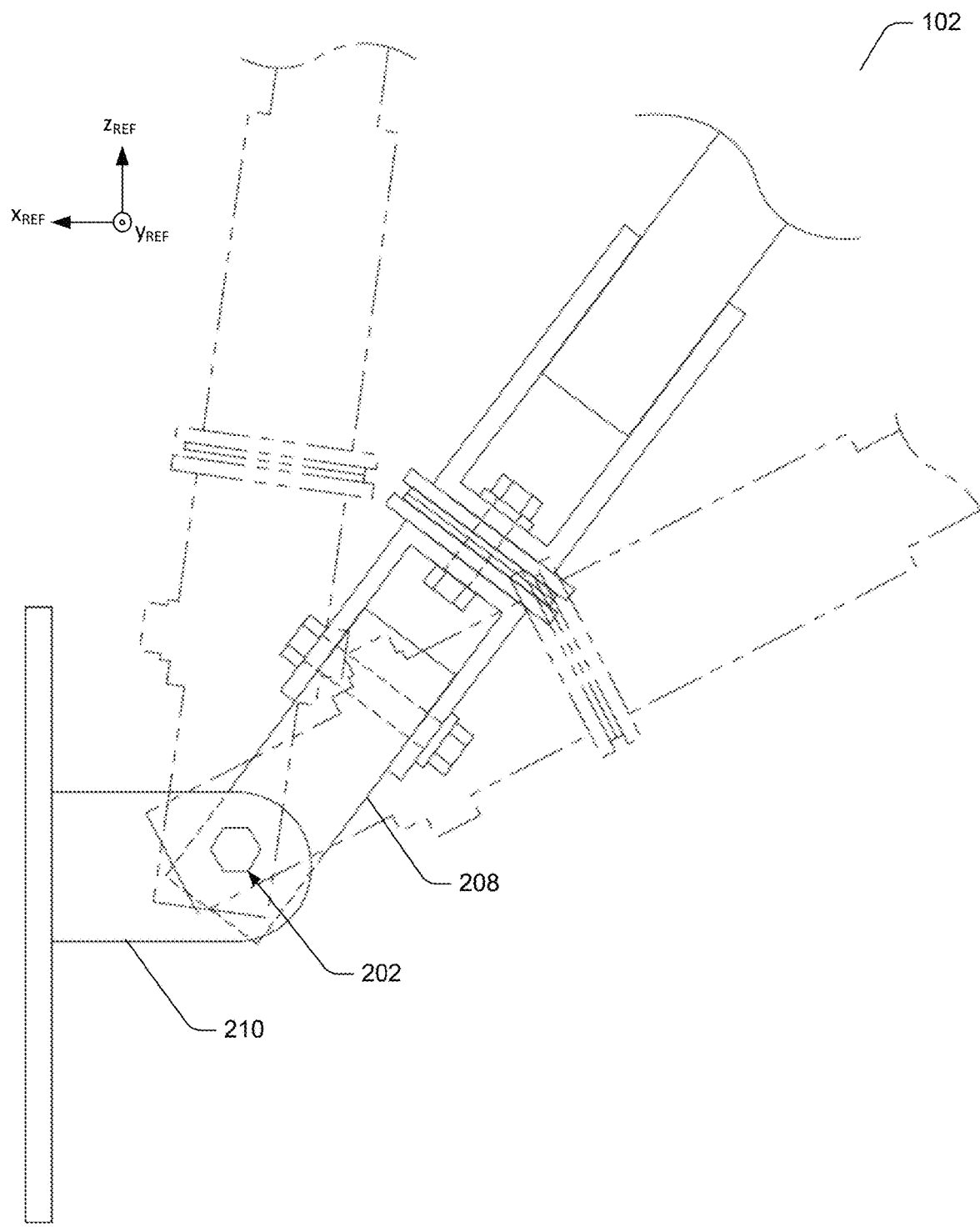
FIG. 3B illustrates an angular rotation of the first lug joint about the cardinal z-axis.
Figure 3C:
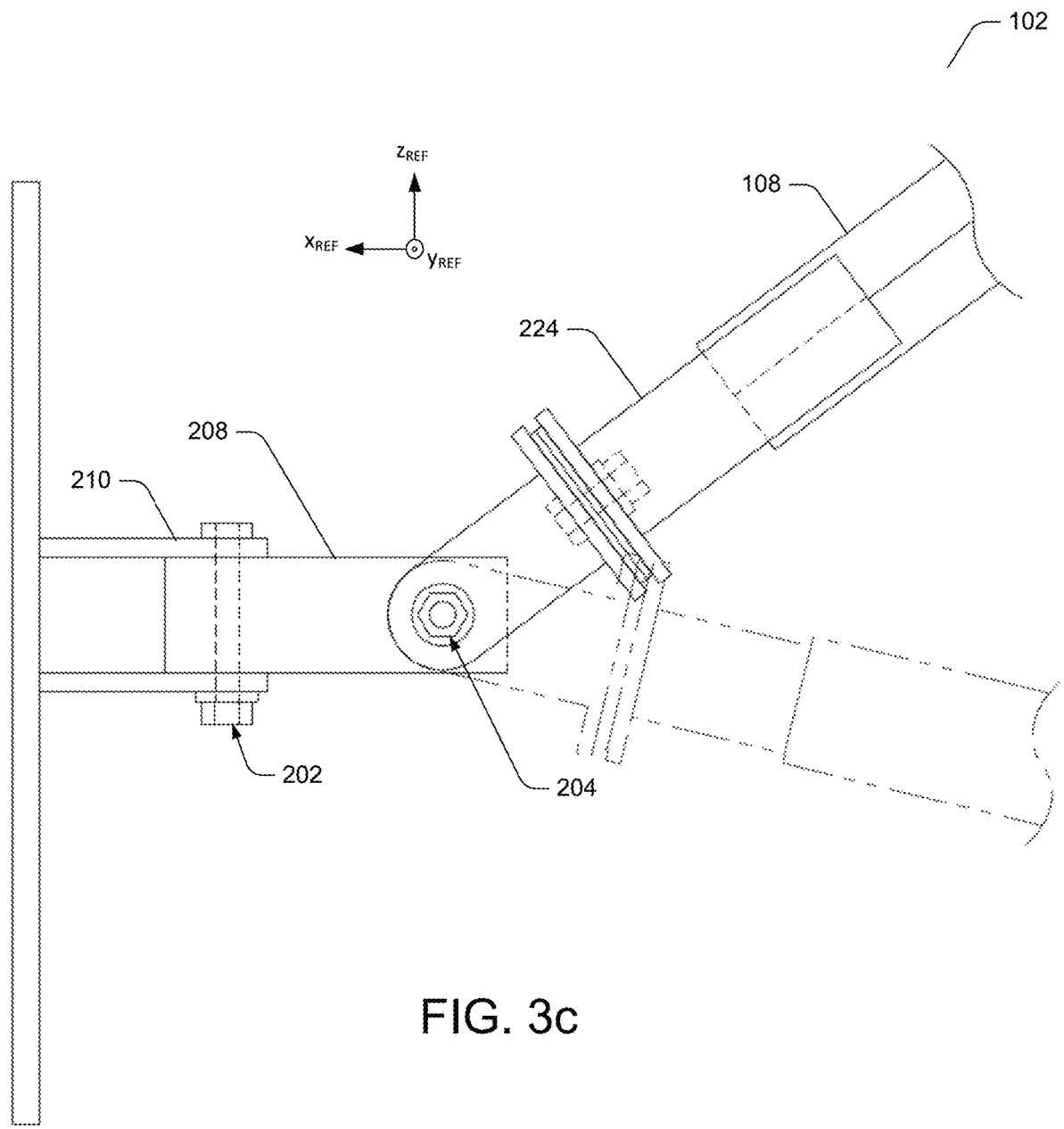
FIG. 3C illustrates an angular rotation of the second lug joint about the cardinal y-axis.
Figure 3D:
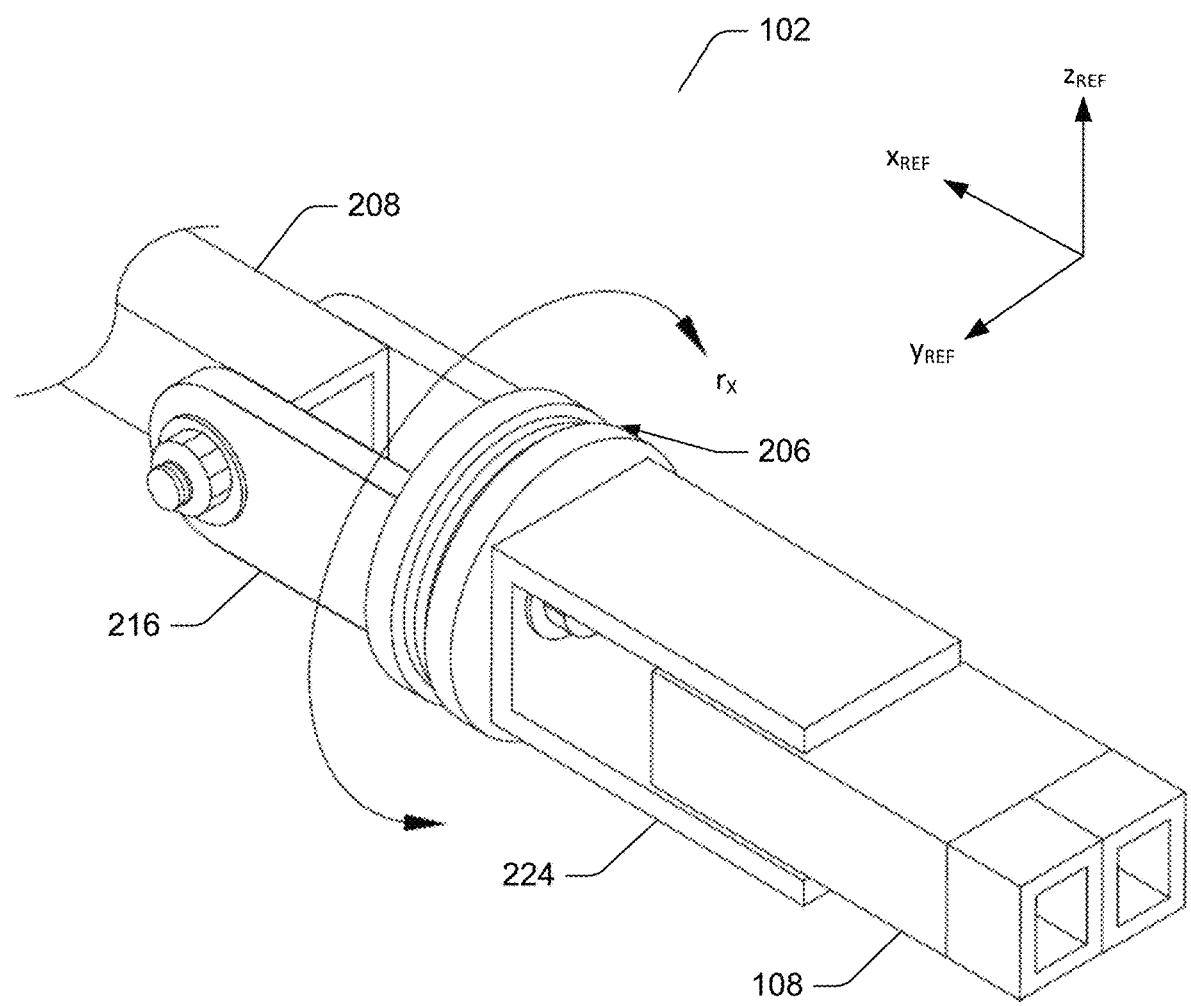
FIG. 3D illustrates an angular rotation of the rotational joint 206 about the cardinal x-axis.

FIG. 3A through to 3D illustrate an exemplary embodiment of the trailer-coupling assembly 102 exhibiting angular rotations at each joint relative to a baseline position. FIG. 3A illustrates a baseline orientation of the trailer-coupling assembly 102. FIG. 3B illustrates an angular rotation of the first lug joint 202 about the cardinal z-axis. FIG. 3C illustrates an angular rotation of the second lug joint 204 about the cardinal y-axis. FIG. 3D illustrates an angular rotation of the rotational joint 206 about the cardinal x-axis. For purposes of clarity, FIGS. 3B through 3D illustrate single-axis rotations of the trailer-coupling assembly 102. However, one of ordinary skill in the art may appreciate that the trailer-coupling assembly 102 is configured to permit simultaneous rotations of all three joints.

For ease of description, the cardinal x-axis is defined as being parallel to the longitudinal axis of the first link member that secures the trailer-coupling assembly to the two-wheel vehicle. Rotation about the x-axis may present a combined roll and yaw of the trailer. The z-axis is defined as being perpendicular to the ground surface such that rotation about the z-axis represents a yaw rotation of the trailer. Further, a rotation about the y-axis, orthogonal to each of the x- and z-axes, represents a pitching and rolling rotation of the trailer relative to the two-wheel vehicle.

FIG. 3A illustrates a baseline position of the trailer-coupling assembly 102. The baseline position of the trailer-coupling assembly 102 corresponds to a nominal alignment of the trailer-coupling assembly 102 relative to the two-wheel vehicle 106. The nominal alignment is represented by the alignment of the trailer-coupling assembly 102 relative to the two-wheel vehicle 106 while the two-wheel vehicle 106 is set up for a straight-line motion. Alignment of the two-wheel vehicle 106 and the trailer-coupling assembly 102 is measured by the relative angle between their respective longitudinal axes, and a nominal alignment corresponds to a condition where the relative angle is substantially equivalent to the designed predetermined angle described with reference to FIG. 1B. Nominal alignment is further exemplified by a colinear alignment of the longitudinal axis of the first link member 208 and a centerline of the first double-shear lug 210.

Further, the baseline position of the trailer-coupling assembly 102 further presumes that each of the first lug joint 202, the second lug joint 204, and the rotational joint 206 exhibits no rotation. Thus, the longitudinal axis of the first link member 208 is colinear with the longitudinal axes of the second link member 216, and the third link member 224.

FIG. 3B illustrates an angular rotation of the first lug joint 202 about the cardinal z-axis. The first lug joint 202 may be configured to rotate about the first fastening system 214 (i.e. cardinal z-axis) in a clockwise direction and an anti-clockwise direction relative to the baseline position of the trailer-coupling assembly 102, as described with reference to FIG. 3A. The angle of rotation may be 90 degrees, 135 degrees, or 160 degrees in the clockwise and anti-clockwise direction. Any angular rotation is permissible subject only to the geometric limits associated with an edge surface abutment of the first double-shear lug 210 and the first link member 208. Rotation about the first fastening system 214 may reflect a yaw rotation of the trailer 110 relative to the two-wheel vehicle 106.

FIG. 3C illustrates an angular rotation of the second lug joint 204 about the cardinal y-axis. The second lug joint 204 may be configured to rotate about the second fastening system 222 (i.e. cardinal y-axis) in a clockwise direction and an anti-clockwise direction relative to the baseline position of the trailer-coupling assembly 102, as described with reference to FIG. 3A. The angle of rotation may be 90 degrees, 135 degrees, or 160 degrees in the clockwise and anti-clockwise direction. Any angular rotation is permissible subject only to the geometric limits associated with an edge surface abutment between the first link member 208 and the second link member 216. Rotation about the second fastening system 222 may reflect a pitch and roll rotation of the trailer 110 relative to the two-wheel vehicle 106.

FIG. 3D illustrates an angular rotation of the rotational joint 206 about the cardinal x-axis. The rotational joint 206 may be configured to rotate about the third fastening system 226 (i.e. cardinal x-axis) in a clockwise and an anti-clockwise direction relative to the baseline position of the trailer-coupling assembly 102, as described with reference to FIG. 3A. The angle of rotation may be 360 degrees in the clockwise and anti-clockwise direction. Any angular rotation is permissible subject only to the geometric limits associated with the trailer 110 and the underlying ground surface. For example, a 360-degree rotation may reflect the trailer 110 overturning. Rotation about the third fastening system may reflect a roll and yaw rotation of the trailer 110 relative to the two-wheel vehicle 106.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:

1. A trailer-coupling assembly for securing a trailer to a two-wheel vehicle, comprising:
   a first lug component that is rigidly fixed to a rear-wheel frame of the two-wheel vehicle;
   a first link member that is connected to the first lug component at a first joint, the first joint permitting a first rotation about a first cardinal axis by at least 90 degrees in a clockwise direction and in an anticlockwise direction relative to a baseline position of the first link member, the baseline position corresponding to a colinear alignment of a longitudinal axis of the first link member and a centerline of the first lug component;
   a second link member that is connected to the first link member via a second joint, the second joint permitting a second rotation about a second cardinal axis that is orthogonal to the first cardinal axis; and
   a third link member that is connected to the second link member via a third joint, the third joint permitting a third rotation about a third cardinal axis that is orthogonal to the first cardinal axis and the second cardinal axis; and
   a hitch-connect member that is rigidly fixed to the third link member, the hitch-connect member being further rigidly fixed to the trailer.

2. The trailer-coupling assembly of claim 1, wherein the first cardinal axis is colinear with a longitudinal axis of the first link member.

3. The trailer-coupling assembly of claim 1, wherein the first link member comprises a first free end and a second free end,
   wherein, the first free end includes a first opening sized to receive a first clevis pin associated with the first joint, the first opening having a centroidal axis that is colinear with the first cardinal axis, and
   wherein, the second free end includes a second opening sized to receive a second clevis pin associated with the second joint, the second opening having a centroidal axis that is colinear with the second cardinal axis.

4. The trailer-coupling assembly of claim 1, wherein the second link member comprises a first free end and a second free end,
   wherein, the first free end having an integrated lug that is configured to interface with the first link member, the integrated lug having a first opening sized to receive a clevis pin associated with the second joint, the first opening having a first centroidal axis that is colinear with the second cardinal axis, and
   wherein, the second free end includes a second opening sized to receive an additional clevis pin associated with the third joint, the second opening having a second centroidal axis that is colinear with the third cardinal axis.

5. The trailer-coupling assembly of claim 1, wherein the third link member comprises a first free end and a second free end,
   wherein, the first free end includes an opening configured to receive a clevis pin associated with the third joint, the opening having a centroidal axis that is colinear with the third cardinal axis, and
   wherein, the second free end is rigidly fixed to the hitch-connect member.

6. The trailer-coupling assembly of claim 1, wherein the second joint is configured to rotate about the second cardinal axis by at least 90-degrees in a clockwise direction and an anti-clockwise direction relative to a baseline position of the second link member, the baseline position corresponding to a colinear alignment of a first longitudinal axis of the first link member and a second longitudinal axis of the second link member.

7. The trailer-coupling assembly of claim 1, wherein the third joint is configured to rotate 360 degrees about the third cardinal axis in a clockwise direction and an anti-clockwise direction.

8. The trailer-coupling assembly of claim 1, wherein the first joint is configured to permit the first rotation simultaneously with one or more of the second joint permitting the second rotation or the third joint permitting the third rotation, in response to the trailer maneuvering over a rough terrain surface or in response to the trailer turning in unison with a change in direction initiated by the two-wheel vehicle.

9. A trailer-coupling apparatus, comprising:
   a first joint that is configured to attach a first lug component to a first link member, the first lug component being rigidly attached to a rear-wheel frame of a two-wheel vehicle, the first joint permitting a first rotation about a first cardinal axis by at least 90 degrees in a clockwise direction and in an anticlockwise direction relative to a baseline position of the first link member, the baseline position corresponding to a colinear alignment of a longitudinal axis of the first link member and a centerline of the first lug component;

a second joint that is configured to attach the first link member to a second link member, the second joint permitting a second rotation about a second cardinal axis that is orthogonal to the first cardinal axis; and a third joint that is configured to attach the second link member to a third link member, the third link member being rigidly fixed to a hitch-connect member that is further rigidly fixed to the trailer, the third joint permitting a third rotation about a third cardinal axis that is orthogonal to the first cardinal axis and the second cardinal axis.

10. The trailer-coupling apparatus of claim 9, wherein the first joint includes a first clevis pin that is aligned to permit the first rotation about the first cardinal axis and restrict translation, and wherein the second joint includes a second clevis pin that is aligned to permit the second rotation about the second cardinal axis and restrict translation.

11. The trailer-coupling apparatus of claim 9, wherein the second joint is configured to rotate about the second cardinal axis by at least 90 degrees in a clockwise and an anti-clock direction relative to a baseline orientation, the baseline orientation corresponding to a co-linear alignment of a first longitudinal axis of the first link member and a second longitudinal axis of the second link member.

12. The trailer-coupling apparatus of claim 9, wherein the third joint is configured to rotate by 360 degrees about the third cardinal axis in a clockwise direction and an anti-clockwise direction.

13. The trailer-coupling apparatus of claim 9, wherein the third joint comprises a clevis pin and at least one washer that is positioned between the second link member and the third link member, wherein, the clevis pin facilitates rotation about the third cardinal axis and restrict translation of the second link member relative to the third link member, and wherein, the at least one washer is included to reduce friction associated with the third rotation between the second link member and the third link member.

14. A trailer-coupling for securing a trailer to a two-wheel vehicle, comprising:

a first lug component that is rigidly fixed to a rear-wheel frame of the two-wheel vehicle;

a first link member that is connected to the first lug component at a first joint, the first joint permitting a first rotation about a first cardinal axis by at least 90 degrees in a clockwise direction and in an anti-clockwise direction relative to a baseline position of the first link member, the baseline position corresponding to a colinear alignment of a longitudinal axis of the first link member and a centerline of the first lug component;

a second link member that is connected to the first link member via a second joint, the second joint permitting a second rotation of at least 90 degrees in a clockwise direction and an anti-clockwise direction about a second cardinal axis;

a third link member that is connected to the second link member via a third joint, the third joint permitting a third rotation of 360 degrees in a clockwise direction and an anti-clockwise direction about a third cardinal axis; and a hitch-connect member that is rigidly fixed to the third link member, the hitch-connect member being further rigidly fixed to the trailer.

15. The trailer-coupling of claim 14, wherein the first cardinal axis is colinear with a longitudinal axis of the first link member, wherein, the second cardinal axis is orthogonal to the first cardinal axis, and wherein, the third cardinal axis is orthogonal to the first cardinal axis and the second cardinal axis.

16. The trailer-coupling of claim 14, wherein the first joint is configured to permit the first rotation simultaneously with one or more the second rotation permitting the second rotation or the third joint permitting the third rotation.

17. The trailer-coupling of claim 14, wherein the hitch-connect member is contoured to orient the trailer-coupling at a predetermined angle relative to a longitudinal axis of the two-wheel vehicle, the predetermined angle being between 30 degrees and 60 degrees.

18. The trailer-coupling of claim 14, wherein the first rotation, the second rotation, or the third rotation occur in response to the trailer maneuvering over a rough terrain surface or in response to the trailer turning in unison with a change in direction initiated by the two-wheel vehicle.

19. The trailer-coupling assembly of claim 1, wherein the hitch-connect member is contoured to orient the trailer-coupling assembly at a predetermined angle relative to a longitudinal axis of the two-wheel vehicle, the predetermined angle being between 30 degrees and 60 degrees.

20. The trailer-coupling apparatus of claim 9, wherein the hitch-connect member is contoured to orient the trailer-coupling apparatus at a predetermined angle relative to a longitudinal axis of the two-wheel vehicle, the predetermined angle being between 30 degrees and 60 degrees.

* * * * *